United States Patent [19]

Nakamoto et al.

[11] Patent Number: 5,546,136
[45] Date of Patent: Aug. 13, 1996

[54] INFORMATION PROCESSING UNIT FOR MODIFYING GAIN IN A FREQUENCY BAND OF A VIDEO SIGNAL

[75] Inventors: Makoto Nakamoto; Yoshihide Yamazaki, both of Kawasaki, Japan

[73] Assignee: Fujitsu Limited, Kawasaki, Japan

[21] Appl. No.: 561,109

[22] Filed: Nov. 20, 1995

Related U.S. Application Data

[63] Continuation of Ser. No. 197,818, Feb. 17, 1994, abandoned.

[30] Foreign Application Priority Data

Feb. 19, 1993 [JP] Japan .................................. 5-030326

[51] Int. Cl.⁶ .................................................. H04N 5/52
[52] U.S. Cl. .......................................... 348/678; 348/571
[58] Field of Search ..................... 348/607, 609, 348/666, 571, 678, 679, 686, 674, 552, 625; 358/174; H04N 5/21, 9/78, 5/52, 5/53

[56] References Cited

U.S. PATENT DOCUMENTS

| | | | |
|---|---|---|---|
| 4,550,340 | 10/1985 | Nicholson et al. | 348/666 |
| 4,884,141 | 11/1989 | Hyakutake | 348/678 |
| 4,985,771 | 1/1991 | Sugimori et al. | 348/666 |
| 5,113,439 | 5/1992 | Hashimoto | 348/607 |
| 5,177,601 | 1/1993 | Back | 348/607 |

FOREIGN PATENT DOCUMENTS

| | | | |
|---|---|---|---|
| 138968 | 10/1980 | Japan | 358/174 |
| 100578 | 8/1981 | Japan | 358/174 |
| 22488 | 2/1984 | Japan | 358/174 |
| 39780 | 2/1986 | Japan | H04N 5/52 |
| 295580 | 12/1987 | Japan | H04N 5/52 |
| 246975 | 9/1992 | Japan | H04N 5/21 |

*Primary Examiner*—Victor R. Kostak
*Assistant Examiner*—Chris Grant
*Attorney, Agent, or Firm*—Staas & Halsey

[57] ABSTRACT

An information processing unit is provided with an attenuation section which attenuates specific frequency components of a video signal output from the information processing unit to a television set, and is also provided with a switch which turns the attenuation section ON or OFF. Thus user can adjust an image display of the video signal by changing the setting of the switch at the information processing unit side based on the displayed image, when the output of the information processing unit is displayed on the television screen.

11 Claims, 3 Drawing Sheets

INFORMATION PROCESSING UNIT FOR MODIFYING GAIN IN A FREQUENCY BAND OF A VIDEO SIGNAL

This application is a continuation of application Ser. No. 08/197,818, filed Feb. 17, 1994, now abandoned.

BACKGROUND OF THE INVENTION

1. Field of the Invention

The present invention relates to an information processing unit, an output of which can be viewed by using a home use television or a television monitor, and the information processing unit can optimally display an image. Particularly the present invention relates to a technology for adjusting a television video signal before the signal is displayed on a television screen.

2. Description of the Related Art

A television set for home use or a television monitor (not having a VHF function) is provided with an S video terminal (for separate luminance and chrominance signals) or a terminal for inputting a composite signal. External video sources are connected to the above terminals, the composite signal or YC separated signals (Y signal: luminance signal, C signal: chrominance signal) are input, and an image is displayed on a television set for home use or the like.

Some home use television sets are provided with an image correction circuit by which specific frequency components (e.g., from 2 MHz to 3 MHz) of the video signal are amplified and an adjustment of the image is executed.

Image sources for home use television sets are not always the output of a video tape recorder or a television broadcast signal, but recently may also include an image from a computer (or information processing unit). Namely, sometimes the output of a computer is not applied only to an exclusive display. The computer image may be displayed on a television monitor having an input terminal for a composite video signal or a YC separated signal as an external input. By displaying the computer output on the home use television set, if the user provides only the main unit of a personal computer (i.e., if the display for the computer is not provided), the personal computer can still be utilized. In this case, the home use television set or the television monitor is connected to the computer to receive a composite video signal or an S video terminal signal, and the image from the computer can be displayed without using an exclusive display for the personal computer.

To display the image from a personal computer on a home use television set, the personal computer must output either an S video signal or a composite video signal that can be used in the home use television.

However, when a television monitor with an image correction circuit as mentioned above is used and the computer image is output thereon, specific frequency components are corrected in the television monitor, and the image may tend to glare. For example, if the television monitor emphasizes the edges of images, the image output from the computer is also emphasized in the edges, thereby causing an glaring effect. This emphasis of the edges is sometimes not necessary when the image from a personal computer is displayed.

Accordingly, if the correction is not carried out by the television monitor, the image from the computer can be displayed without glaring. However, if the television monitor is provided with a fixed correction, i.e., the user cannot alter the correction, the correction cannot be prevented. Recently, with some television monitors or the like the amount of image correction can be set by the user, however, this is troublesome if the user must turn off the image correction whenever the image to be displayed is output from a computer.

SUMMARY OF THE INVENTION

An object of the present invention is to display a natural and non-glaring image by providing attenuation means for attenuating specific frequency components of a luminance signal of a video signal, in an information processing unit, and switching means for turning ON or OFF the attenuation means, and by turning the switching means ON, when the output of the information processing unit is input to a home use television set or a television monitor for display of a corresponding an image is displayed on a screen thereof.

According to a first aspect of the present invention, there is provided an information processing unit comprising generation means for generating a video signal to be applied to a home use television set or a television monitor; attenuation means for attenuating specific frequency components included in a predetermined frequency band in the generated signal; and switching means for switching operations of the attenuation means. When the switching means is turned ON, the attenuation means attenuates specific frequency components, and when the switching means is turned OFF, the signal generated by the generation means is output as it is.

It is preferable that the video signal output from the generation means includes a luminance signal and a chrominance signal, and the attenuation means attenuates only the luminance signal.

According to a second aspect of the present invention, there is provided an information processing unit comprising generation means for generating a video signal to be applied to a home use television set or a television monitor; and correction means for correcting the video signal as that the video signal is displayed as a suitable image for a home use television set or television monitor.

The second aspect of the present invention further comprises switching means for designating operations of the correction means. When the switching means is turned ON, the video signal corrected by the correction means is output to the home use television set or the television monitor, and when the switching means is turned OFF, the video signal is output to the home use television set or the television monitor as is.

Also, it is preferable that the information processing unit is connected to a home use television set or television monitor, and that the home use television set or television monitor is provided with an image correction portion therein.

Other features and advantages of the invention will be apparent from the following description with reference to the accompanying drawings.

DESCRIPTION OF THE PREFERRED EMBODIMENTS

Figure 1:
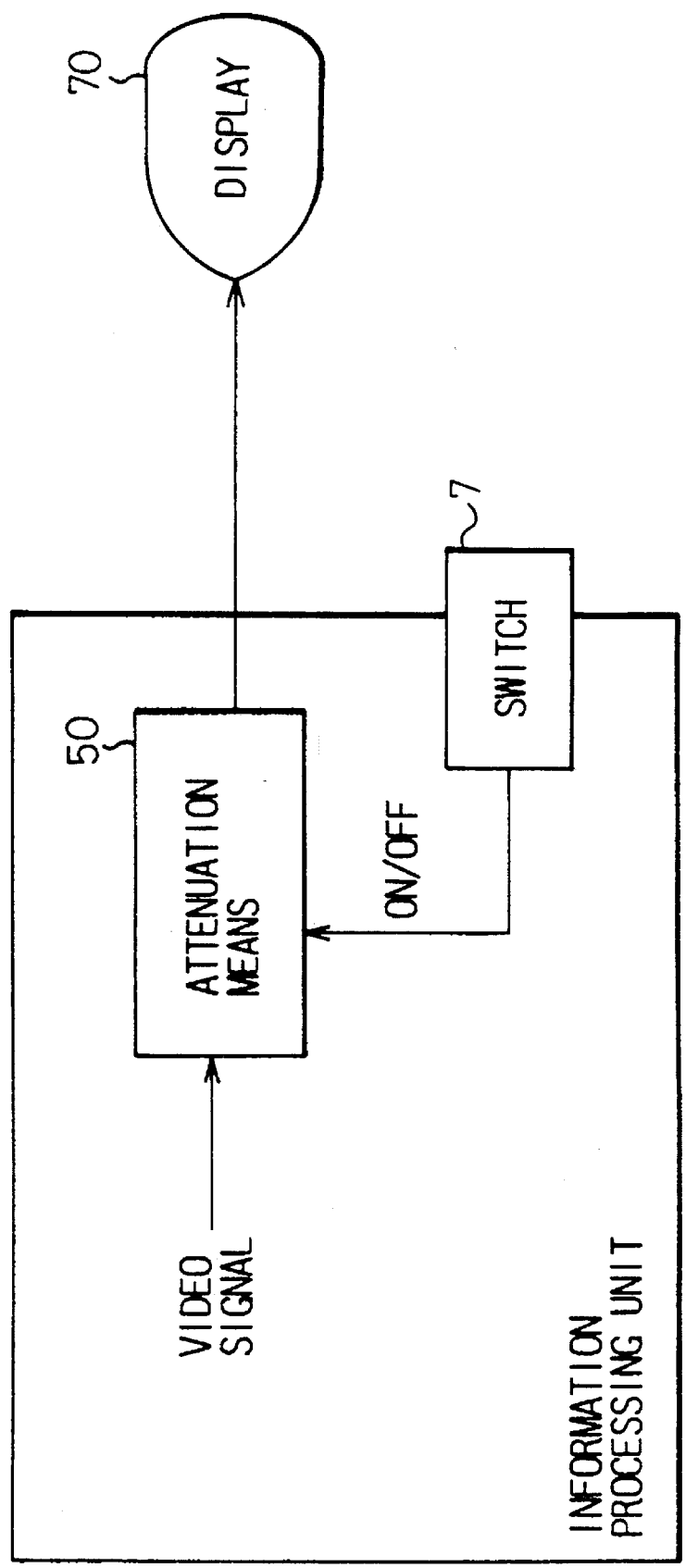
FIG. 1 is a block diagram for explaining a summary of the present invention.

First, a summary of the present invention is given with reference to FIG. 1.

An information processing unit, according to the present invention, provides an attenuation means 50 which attenuates specific frequency components, included in a predetermined frequency band, in an output signal to be output to a television set, and a switch means 7 by which the attenuation means is turned ON. When a computer image output from the information processing unit is displayed on the television set 70, a user watches an image on the television screen and adjusts the displayed image by turning the above switch 7 attached to the computer ON.

When the correction of the signal, wherein the specific frequency components are emphasized, is executed at the television monitor side, if an image for which correction is not necessary is input to the television monitor from the computer, in this case, as mentioned above, the image becomes glaring and unnatural. In the present invention, the means for attenuating the special frequency components is turned ON by the switch means provided on the computer side. By the attenuation means, the signal from computer is attenuated in the specific frequency components, corresponding to the frequency band emphasized in the television monitor, and is then output to the television monitor. By then emphasizing the signal at the television monitor side, a correctly compensated image can be obtained.

Figure 2:
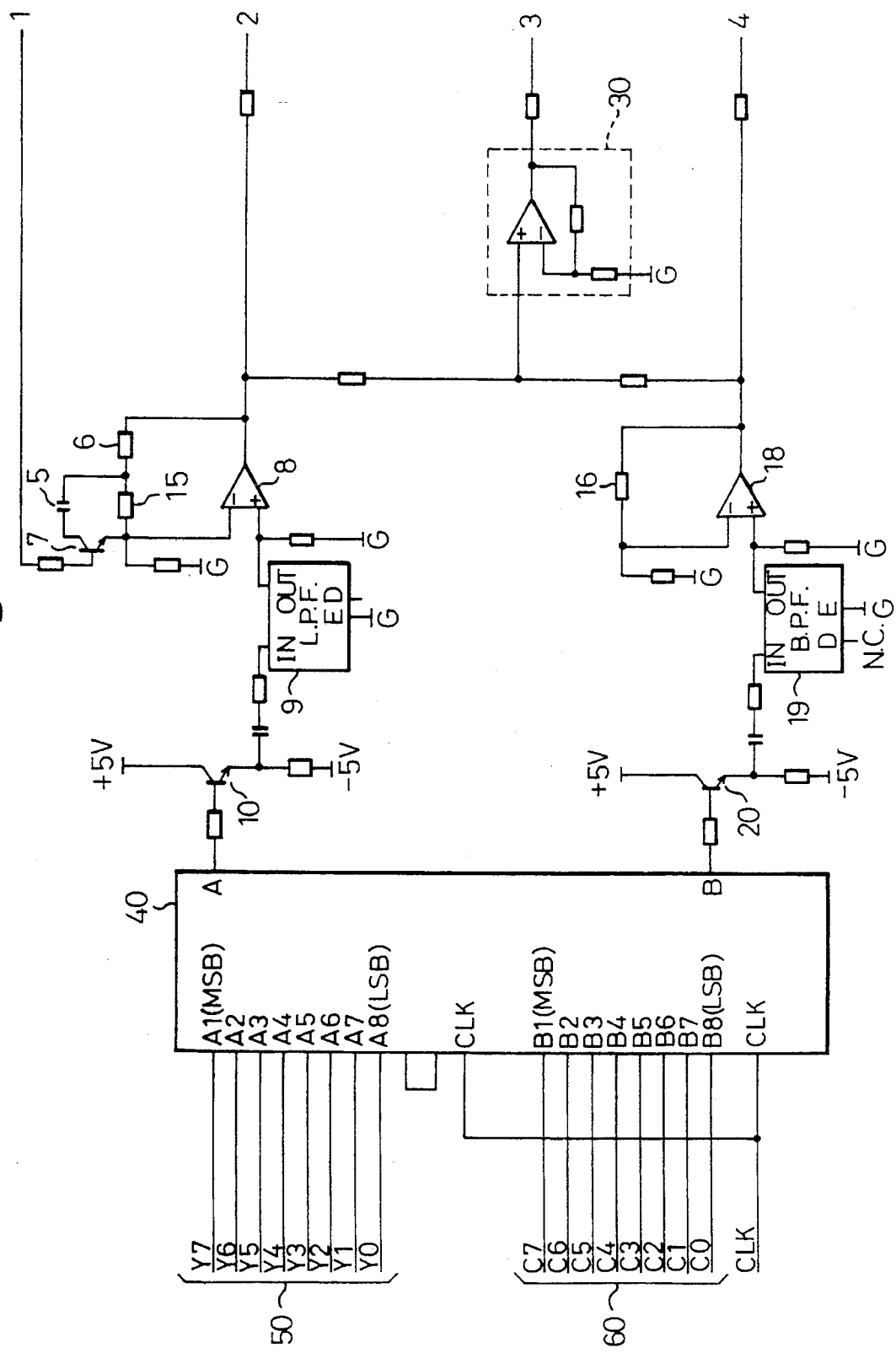
FIG. 2 is a circuit diagram showing an embodiment of the present invention.
Figure 3:
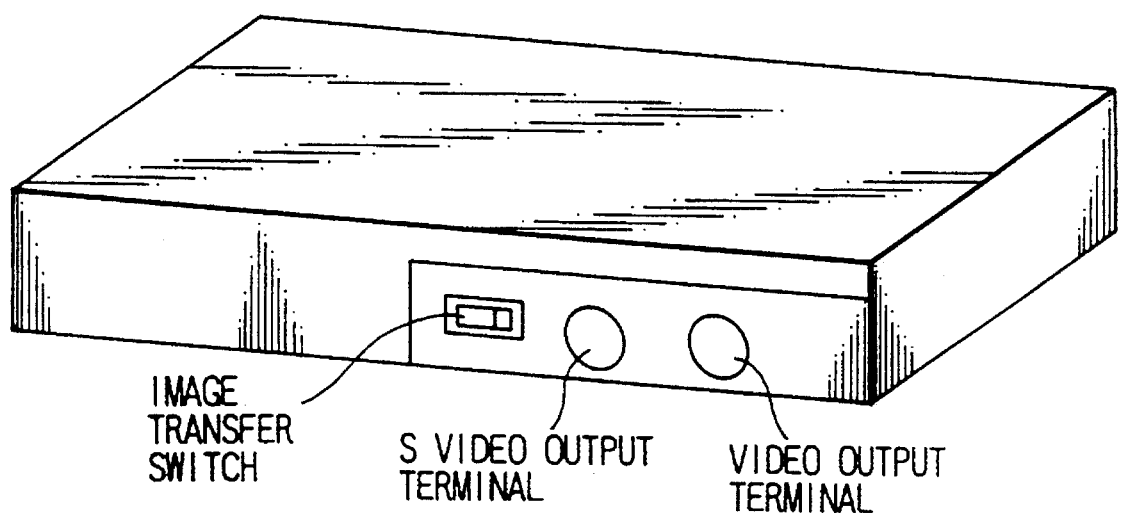
FIG. 3 is a perspective view showing the external appearance of an information processing unit according to the embodiment of the present invention.

FIG. 2 is a circuit diagram of the video signal output section of the embodiment of the invention. FIG. 3 is an external view and shows a video signal output terminal and a transfer switch. Hereinafter, the embodiment is explained with reference to FIG. 2.

Digital image information is transmitted through signal lines 50 (Y0–Y7) and 60 (C0–C7), and is input in parallel. A reference numeral 50 shows the digital value of the luminance signal, 60 shows the digital value of the chrominance signal. The signal lines, 50 and 60, are input into a digital to analog conversion section 40 as signals A1 to A8 and B1 to B8 and are converted to analog signals A and B, respectively. Then, the luminance signal is output to an output terminal A and the chrominance signal is output to an output terminal B.

The output A of the luminance signal is input to a transistor 10. The transistor 10 and peripheral elements act as an impedance matching circuit. The electrolytic capacitor connected to the output of the transistor 10 blocks direct current. The rectangular elements in the circuit diagram indicate resistances. A low-pass filter 9 smoothes the passing signal which is usually a rectangular wave when the digital signal is converted to an analog signal.

The gain of an amplifier 8 is determined by a feedback resistance 6. Reference 5 is a capacitor, and 7 is a switch which consists of a transistor and is turned ON or OFF by an application of a voltage signal 1. When the switch 7 is OFF, the gain of the amplifier is determined only by resistances (15 and 6).

When the capacitor 5 is connected into the circuit by the switch 7, more high frequency components are fed back. Accordingly, the gain of the amplifier in the high frequency range is attenuated more than that of the lower frequencies. In the embodiment, the gain of the amplifier for frequencies between 2 and 3 MHz is attenuated.

Therefore, when the switch 7 is turned ON, an output (signal 2) of the amplifier 8 for frequencies between 2 and 3 MHz becomes lower in comparison with other frequencies.

In the case where the image correction is carried out using a home use television set or television monitor, sometimes frequency components in the vicinity of 2 MHz in the luminance signal (the most sensitive for human beings) are emphasized. If the image in the home use television set or the television monitor is natural and thus not glaring, the switch is turned OFF. If the image is not natural and thus is glaring, the switch is turned ON so that the above frequency components are attenuated in the output image of the computer. In this case, the attenuated luminance signal is amplified in the television monitor.

In the embodiment, the chrominance signal 60 is only amplified by the amplifier 18, and is not attenuated as to the special frequency components therein. The operation of a circuit including a transistor 20 and circuit elements near the transistor 20 is the same as that of the circuit including the transistor 10 and circuit elements near the transistor 10. The chrominance signal is passed through a band-pass filter 19, instead of the low-pass filter 9, because the frequency band of the chrominance signal is different from that of the luminance signal. The the chrominance signal output (reference number 4) is supplied to the television monitor.

A circuit 30 generates a composite signal by mixing the luminance signal and the chrominance signal output 4. By mixing these signals output 2, the signal level becomes one half, so the mixed signals are amplified by a factor of two. The composite signal is output as a reference number 3.

FIG. 3 shows an external view of the computer (information processing unit) and particularly shows output terminals or the like. An S video output terminal, in FIG. 3, supplies the luminance signal 2 and the chrominance signal 4, shown in FIG. 2. A video output terminal in FIG. 3 supplies the composite signal in FIG. 2. An image transfer switch in FIG. 3 turns ON or OFF the application of the voltage signal 1 in FIG. 2.

Although the present invention is explained with reference to the embodiment described above, the spirit of the invention is determined in accordance with the scope of the appended claims, and it is understood that various changes may be made within the scope of the claims, and such changes are included within the scope of the claims.

As explained above, in the information processing unit of the present invention, wherein a home use television set or television monitor is supplied with a luminance signal, chrominance signal, or composite signal to display an image, means for attenuating specific frequency components is provided, and further, a switch for turning ON or OFF the means is provided, in order to enable image correction when using a home use television set or the like. Thus, a user can adjust the video image easily and quickly based on the displayed image.

We claim:

1. An information processing unit comprising:

generation means for generating, and producing as an output, a video signal having specific frequency components and nonspecific frequency components to be applied to a home use television set or a television monitor:

amplifying means for receiving the video signal output from the generation means and selectively operable in a first state for amplifying the specific frequency components and the nonspecific frequency components in the received video signal with a first gain and in a second state for amplifying the nonspecific frequency components in the received video signal with the first gain and for amplifying the specific frequency components in the received video signal with a second gain less than the first gain; and switching means for switching the amplifying means to a selected one of the first and second states and wherein, when the switching means is turned ON, the amplifying means operates in the second state and, when the switching means is turned OFF, the amplifying means operates in the first state.

2. An information processing unit as set forth in claim 1, wherein the video signal output from the generation means comprises a luminance signal and a chrominance signal, and the amplifying means amplifies only the luminance signal.

3. An information processing unit as set forth in claim 1, wherein the amplifying means is connected to a home use television set provided with an image correction portion.

4. An information processing unit as set forth in claim 2, wherein the amplifying means is connected to a television monitor provided with an image correction portion.

5. An information processing unit comprising:

generation means for generating, and producing as an output thereof, a video signal having a luminance signal and a chrominance signal to be applied to a video display unit;

gain means, connected to the generation means and receiving the video signal output thereby, for supplying gain to the luminance signal in response to a first condition and for a first frequency bandwidth, and for reducing said gain supplied to the luminance signal in specific frequency components of the luminance signal in response to a second condition, thereby to impart correction to the video signal; and switching means for selecting between the first condition and the second condition in response to a switch signal wherein, when the switching means is turned ON, the second condition is communicated to the gain means and thereby the video signal corrected by the gain means is output to the video display unit and when the switching means is turned OFF, the first condition is communicated to the gain means and thereby the video signal is output to the video display unit without correction.

6. An information processing unit as set forth in claim 5, wherein the video display unit is a home use television set that is provided with an image correction portion therein.

7. An information processing unit as set forth in claim 5, wherein the video display unit is a television monitor that is provided with an image correction portion therein.

8. An information processing unit comprising:

generation means for generating and producing as an output a video signal having chrominance and luminance components;

an operational amplifier connected to the generation means for receiving the video signal output therefrom and amplifying the luminance components by a first gain and outputting the amplified video signal, said operational amplifier being selectively operable to modify the first gain to a second gain, less than the first gain, for a predetermined frequency band in the luminance components; and switching means connected to the operational amplifier and responsive to a switch signal for controlling the operational amplifier to amplify the luminance components selectively by the first gain and by a second gain, less than the first gain, for a predetermined frequency band in response to a switch signal.

9. An information processing unit comprising:

generating means for generating a video signal having a luminance signal of first and second pluralities of frequency components and a chrominance signal;

switching means for selectively generating an active condition or an inactive condition; and gain means connected to the generating means for receiving the luminance signal therefrom and connected to the switching means for receiving the selectively generated active condition or inactive condition therefrom, the gain means being responsive to the active condition for supplying a first gain to the first plurality of frequency components of the luminance signal and a second gain, less than the first gain, to the second plurality of frequency components of the luminance signal and being responsive to the inactive condition for supplying the first gain to the first and second pluralities of frequency components of the luminance signal.

10. An information processing system comprising:

a video signal source outputting a video signal having a luminance signal and a chrominance signal;

switching means, responsive to a switching signal, for selectively outputting an ON condition or an OFF condition in response thereto;

luminance gain means, connected to the switching means and the video signal source, for receiving the luminance signal from the video signal source, said luminance gain means being responsive to the OFF condition for imparting a first gain to the luminance signal and being responsive to the ON condition for imparting the first gain to a first predetermined frequency band of the luminance signal and a second gain, less than the first gain, to a second predetermined frequency band of the luminance signal;

chrominance gain means connected to the video signal source for receiving the chrominance signal therefrom, said chrominance gain means imparting a third gain to the chrominance signal;

a composite signal generator electrically connected to the luminance gain means and the chrominance gain means for mixing the luminance signal and the chrominance signal to generate a composite video signal; and a video display for receiving and displaying the composite video signal.

11. An information processing unit comprising:

generation means for generating and outputting a video signal having specific frequency components and nonspecific frequency components to be applied to a television set receiver;

amplifying means for receiving the video signal output from the generation means and selectively operable, in a first state, for amplifying the specific frequency components and the nonspecific frequency components in the received video signal with a first gain and, in a second state, for amplifying the nonspecific frequency components in the received video signal with the first gain and for amplifying the specific frequency components in the received video signal with a second gain, less than the first gain; and switching means for switching the amplifying means to a selected one of the first and second states.

* * * * *